(12) United States Patent
Raux et al.

(10) Patent No.: US 10,635,861 B2
(45) Date of Patent: Apr. 28, 2020

(54) ANALYZING LANGUAGE UNITS FOR OPINIONS

(71) Applicant: Facebook, Inc., Menlo Park, CA (US)

(72) Inventors: Antoine Raux, Cupertino, CA (US); Martin Plouy, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

(21) Appl. No.: 15/858,616

(22) Filed: Dec. 29, 2017

(65) Prior Publication Data
US 2019/0205381 A1 Jul. 4, 2019

(51) Int. Cl.
*G06F 40/30* (2020.01)
*H04L 12/58* (2006.01)
*G06F 40/56* (2020.01)

(52) U.S. Cl.
CPC .............. *G06F 40/30* (2020.01); *G06F 40/56* (2020.01); *H04L 51/02* (2013.01)

(58) Field of Classification Search
None
See application file for complete search history.

(56) References Cited

U.S. PATENT DOCUMENTS

| | | | |
|---|---|---|---|
| 6,795,808 B1 | 9/2004 | Strubbe et al. | |
| 2009/0319518 A1* | 12/2009 | Koudas | G06F 16/951 |
| 2012/0166180 A1* | 6/2012 | Au | G06F 17/274 |
| | | | 704/9 |
| 2013/0091117 A1* | 4/2013 | Minh | G06F 17/30864 |
| | | | 707/709 |
| 2015/0364128 A1 | 12/2015 | Zhao et al. | |
| 2016/0094507 A1* | 3/2016 | Li | G06F 16/951 |
| | | | 709/206 |
| 2018/0293483 A1 | 10/2018 | Abramson et al. | |

* cited by examiner

*Primary Examiner* — Antim G Shah

(57) ABSTRACT

This application addresses techniques for personalizing natural language generation by conversational agents. These solutions allow for human-like, large scale opinion expression using a consistent style or personality. Training sentences may be retrieved and a vocabulary may be built based on an analysis of the training sentences. The sentences may be analyzed to determine: (1) whether they express an opinion; (2) whether the opinion is positive or negative; (3) whether the sentence fits in the context of the currently communication; and (4) whether the sentence came from a person with first-hand experience of the topic. Further classifications may be made based on characteristics such as the age or gender of the person expressing the opinion. These opinions may be entered into a repository and used for opinion expression, for example by using the statements directly in a conversation or by training a language generation model with the opinions.

20 Claims, 14 Drawing Sheets

Centralized Communication System 500

Distributed Communication System 550

ANALYZING LANGUAGE UNITS FOR OPINIONS

BACKGROUND

Language generation is often used by artificial intelligences, such as chat bots, to conduct a conversation with a human user. A goal of language generation is to make the language sound as natural as possible. Unfortunately, existing techniques for language generation often produces language that sounds artificial or "canned."

This is especially true when the artificial intelligence is asked to express an opinion on a topic (e.g., whether a given movie is good or not). Conventionally, opinion expression is handled using templates, in which predefined responses are provided. The predefined responses may include variables into which details of the response can be inserted. Because these intelligences use predefined responses, each response tends to sound the same and the intelligence is typically viewed as robotic, lacking a personality of its own.

DETAILED DESCRIPTION

Introduction

Figure 1A:
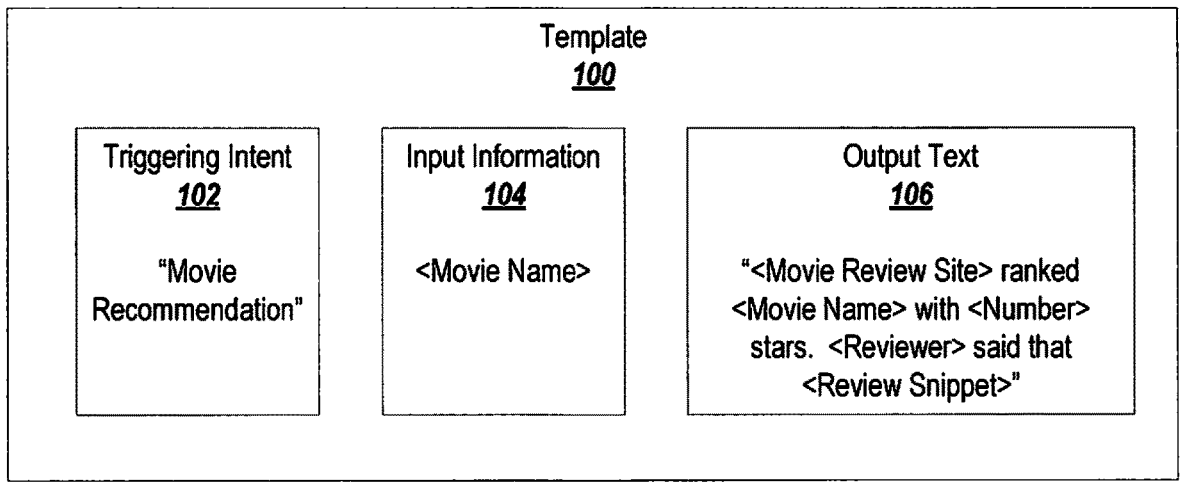
FIGS. 1A-1C depict an example of template-based opinion generation system.

FIG. 1A depicts an example of a conversational template 100 as described above. The template may include an identifier of a triggering intent 102, which informs the artificial intelligence when the template 100 is to be used. In this example, the template 100 is used when the intelligence detects that a user's intent is to receive a movie recommendation.

In some cases, knowing the intent may be sufficient to generate a response. For instance, if the intelligence represents a chatbot associated with a movie theater and a user asks "what are your hours," the chatbot may determine that this is an inquiry into the times at which the movie theater is open. The chatbot may retrieve the desired information from a database, profile information for the theater, etc., and respond accordingly.

On the other hand, some types of intents require certain information before a response can be generated. For instance, when a user asks for a movie recommendation, the bot may need to know the name of the movie before providing a response. In these cases, the template is generally provided with a list 104 of required input information. The chatbot may include logic that guides a conversation to request any missing input information 104 from the user (or to infer the missing input information from other aspects of the conversation or known information about the user).

The template 100 may further include output text 104, which represents predetermined language to be used in responding to the triggering intent 102. The output text 106 may include variables into which the provided input and any retrieved output information may be inserted.

Figure 1B:
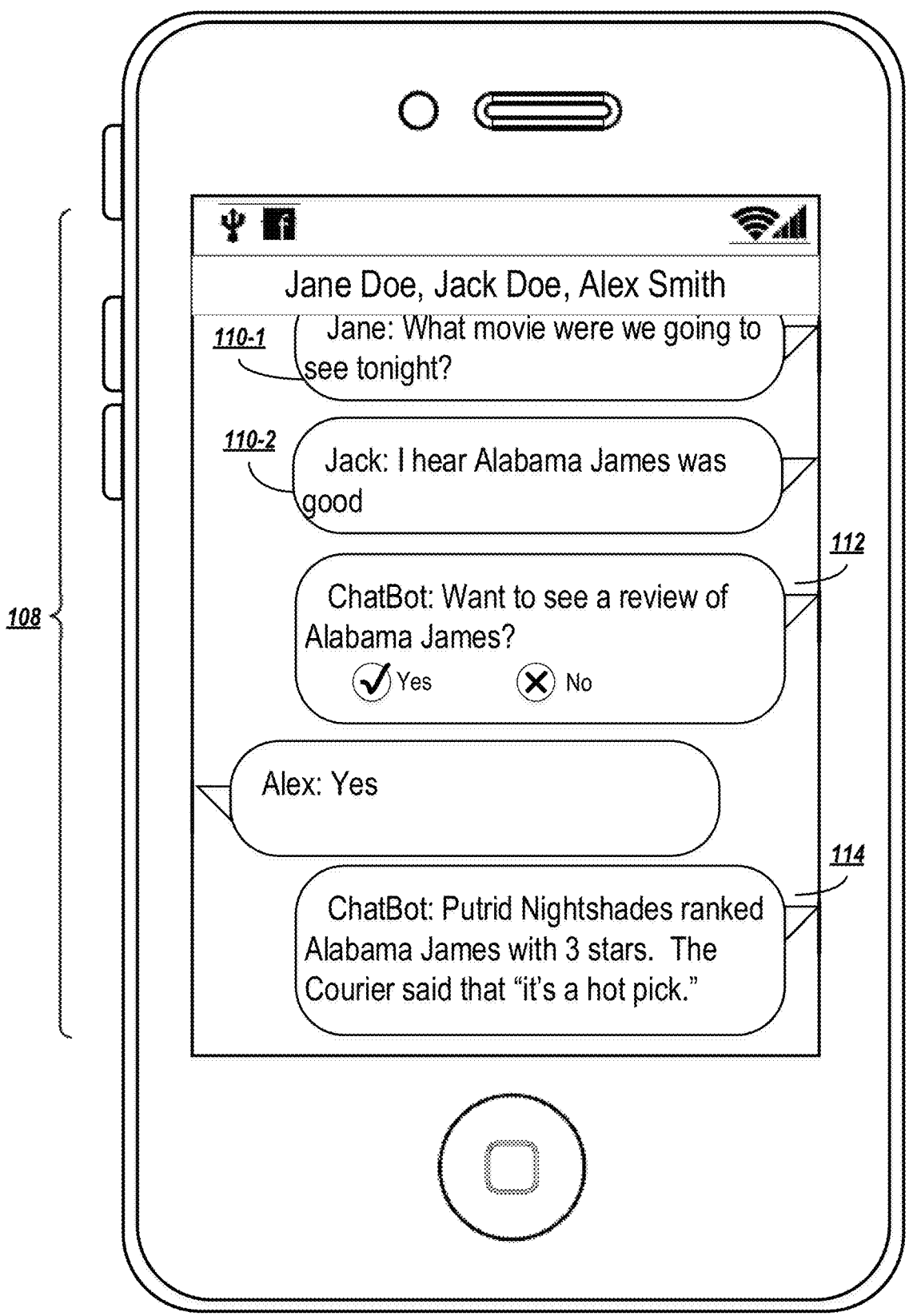

FIG. 1B shows an example of a chatbot employing the interface 100 in action. In this example, several users are exchanging messages 110-1, 110-2 in a messaging interface 108. Based on the messages 110-1, 110-2, the chatbot determines that the users may be interested in a movie recommendation (i.e., identifying the intent of the messages 110-1, 110-2 as corresponding to the "movie recommendation" triggering intent from the template). In this case, the template requires a movie name as input information, and the chat bot is able to determine from the message 110-2 which movie the users are interested in.

The chatbot therefore applies the template to generate output text. In this case, the chatbot is preconfigured to retrieve movie reviews from a particular review site (e.g., the chatbot may be associated with the review site, or the review site may have paid a fee to the chatbot owner to promote their reviews). The chatbot applies the template to create a message 114, which is shared into the conversation.

Figure 1C:
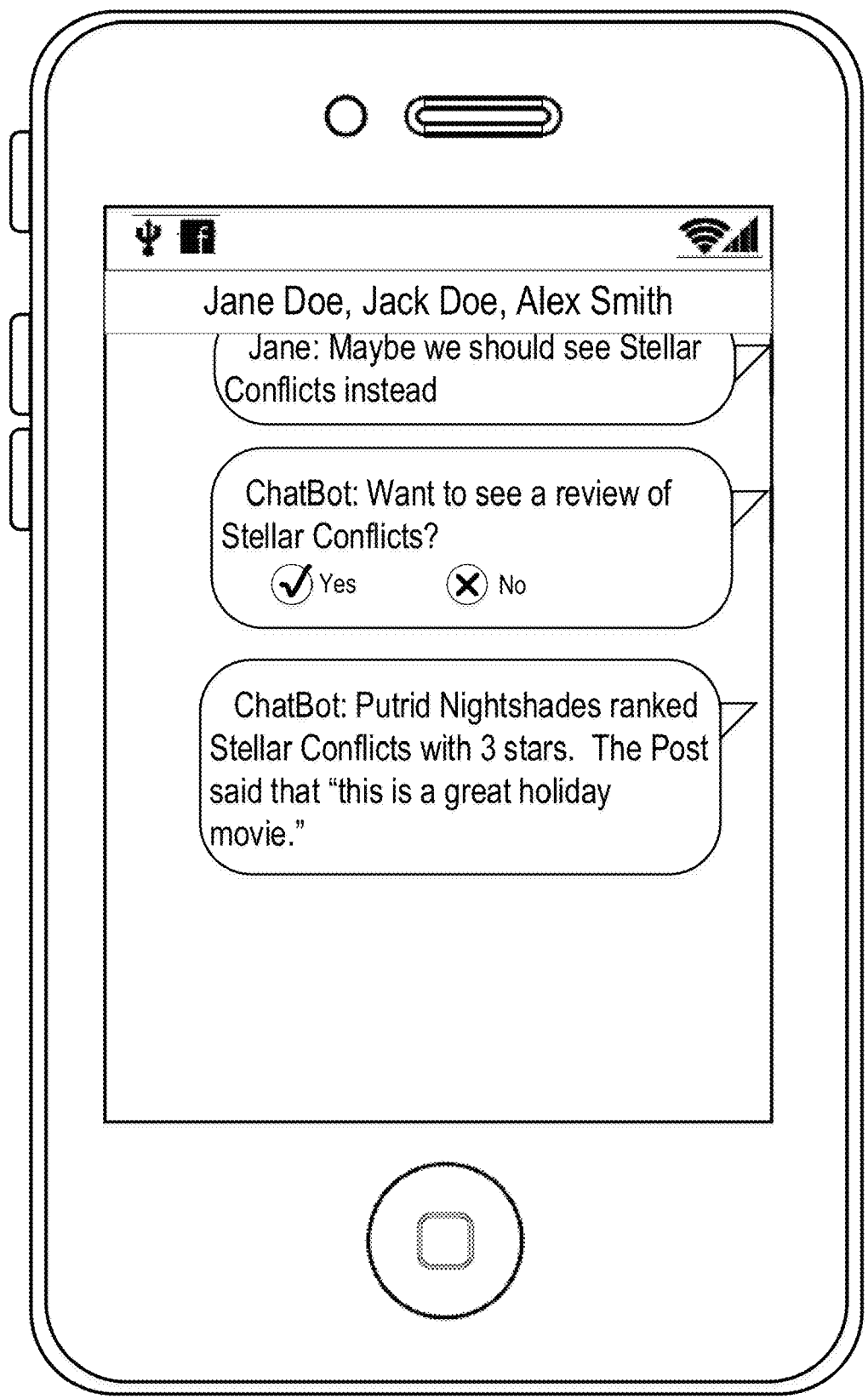

As shown in FIG. 1C, the chatbot may be called upon to generate additional opinions regarding other movies. However, because the opinions are generated based on the template, each response sounds very similar (in the examples of FIGS. 1B and 1C, those responses are "Putrid Nightshades ranked Alabama James with 3 stars. The Courier said that 'it's a hot pick'" and "Putrid Nightshades ranked Stellar Conflicts with 3 stars. The Post said that 'this is a great holiday movie'").

Moreover, a template-based chatbot typically does not exhibit much personality. To the extent that the chatbot does exhibit personality, it is typically preconfigured and therefore does not adapt to the users participating in the conversation.

Instead of predefined, canned responses, it would be desirable to generate varied, natural-sounding opinions. For example, compare the responses of the chatbot in FIGS. 1B and 1C to the responses in FIG. 1D ("I saw Stellar Conflicts last week. It was okay, but I think the rest of the series is better"; and "Alabama James was the best movie I've seen all year. Definitely check it out."). These latter responses are more varied and naturalistic. Furthermore, they are more open to exhibiting a personality, because they are not limited to the static text and variables as used in the template.

Figure 1D:
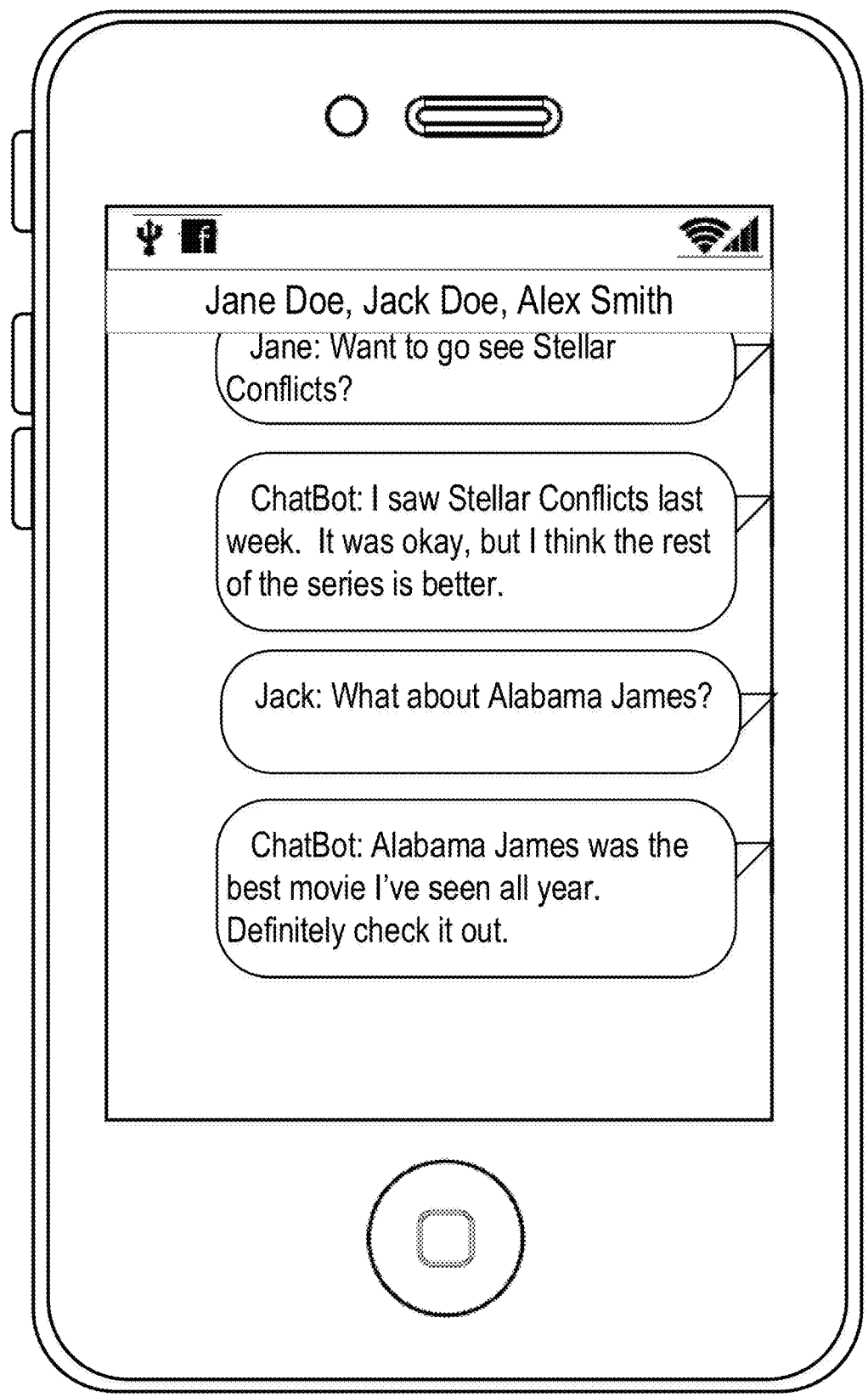
FIG. 1D depicts an example of the output of an opinion generation system according to exemplary embodiments described herein.

The present application is directed to a system and techniques for generating opinion statements that are natural sounding and dynamic, like those depicted in FIG. 1D. These and other features of exemplary embodiments are described in more detail below. Before further discussing the exemplary embodiments, however, a general note regarding data privacy is provided.

A Note on Data Privacy

Some embodiments described herein make use of training data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Opinion Generation Environment

Figure 2:
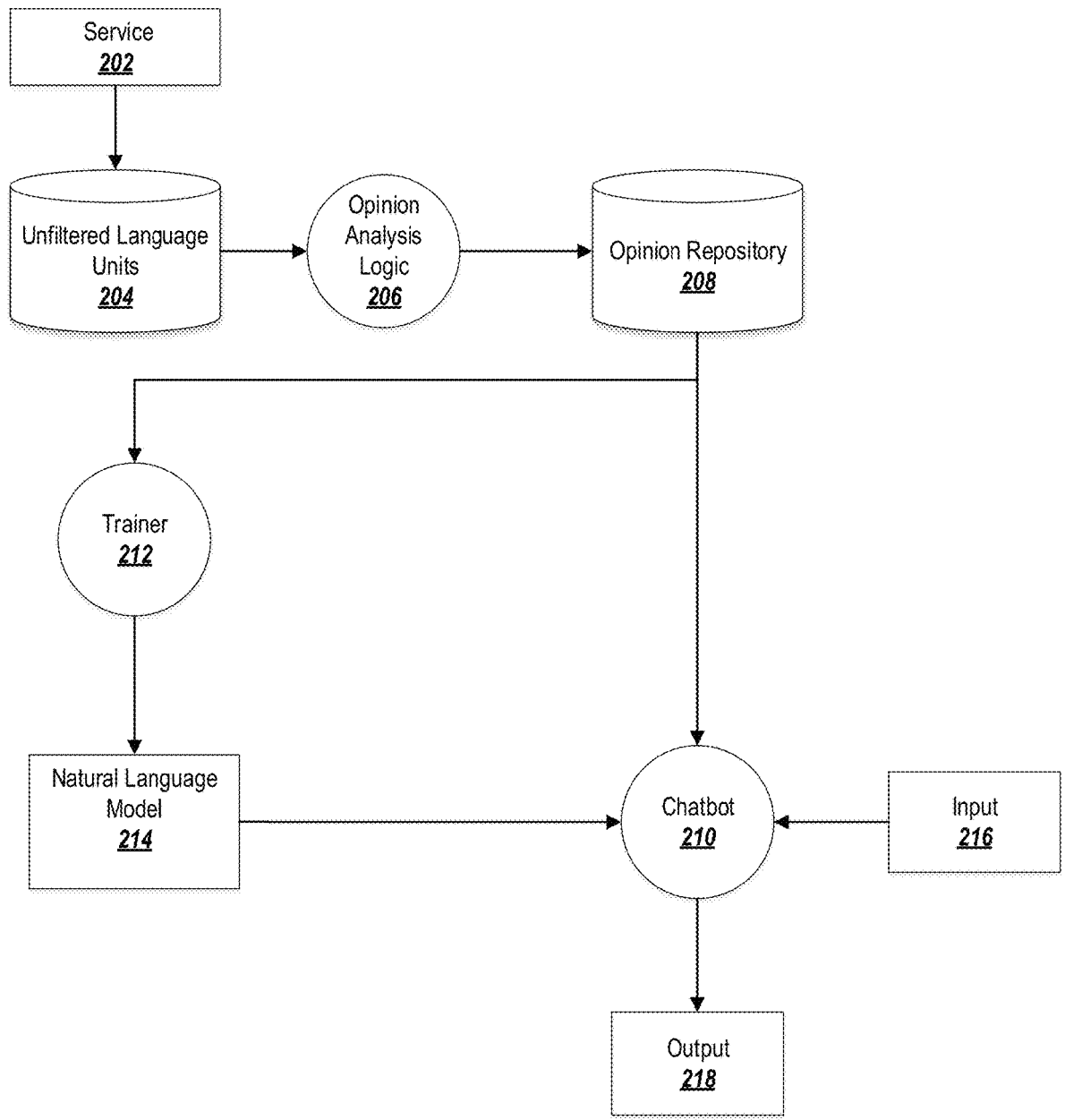
FIG. 2 depicts an example of an opinion generation environment.

FIG. 2 depicts an example of an exemplary environment 200 for generating naturalistic opinion statements. At a high level, the environment 200 analyzes language made available to it in order to identify language that corresponds to opinions having characteristics that make those opinions well-suited to use in a conversation by an artificial intelligence, such as a chat bot.

A repository 204 may include a number of language units (e.g., sentences, phrases, etc.). The repository may be unfiltered in that the language units include a mix of opinion statements (i.e., language units that express an opinion) and non-opinion statements; moreover, the opinion statements may include some opinion statements that are less suitable for use by the artificial intelligence, such as opinion statements that do not result from first-hand knowledge of the topic of the opinion ("e.g., "I heard from my buddy Steve that the movie Alabama James is great!").

The language units in the repository may originate from a service 202 that represents one or a combination of a social networking service (e.g., Facebook), a messaging service (e.g., Facebook Messenger), a media sharing service (e.g., Instagram) and/or a review service. These services may make language units available, assuming that users have consented to having their posts, comments, etc. shared with the opinion generation environment 200. The language units may be retrieved from the service 202 via mining logic.

Opinion analysis logic 206 may analyze the language units in the repository 204 to identify language units suitable for use with an artificial intelligence to express an opinion. The inner workings of the opinion analysis logic 206 are described in detail in connection with FIG. 4; as a brief summary, the language units may be analyzed to determine: (1) whether they express an opinion; (2) whether the opinion is positive or negative; (3) a context of the language unit; and (4) whether the sentence came from a person with first-hand experience of the topic, among other features.

The opinion analysis logic 206 may identify language units suitable for opinion expression and may store those language units in an opinion repository 208. The opinion repository 208 may store multiple language units dedicated to the same or different topics, and expressing a variety of opinions in a variety of different ways.

The opinions in the opinion repository may be applied by an artificial intelligence directly (e.g., by using copies of the opinion statements, which may be slightly altered to fit the conversation context, directly in a conversation) or indirectly (e.g., by training a natural language generator model using the opinion statements). In some embodiments, the language units themselves (sentences or phrases) may represent a vocabulary which the artificial intelligence may draw upon; in others, subsets of the language units (e.g., individual words and phrases) may be used as a vocabulary. The former type of vocabulary may be well-suited to direct application of the language units, whereas the latter may be well-suited to indirect application.

In a direct application scenario, a chatbot 210 may participate in a conversation with devices or applications associated with one or more human users. The chatbot 210 may identify an intent of one or more messages of the conversation received as input 216, and may determine that an opinion statement may be used to fulfill that intent. The chatbot 210 may retrieve an opinion statement that fits the current conversation context from the repository 208 and apply the opinion statement in the current conversation.

As part of this process, the chatbot 210 may determine if a positive, negative, or neutral opinion is needed. For example, the chatbot 210 may consult a review service to determine an overall review score for the topic under discussion (e.g., a movie, a restaurant, a vacation destination, etc.). Based on the overall review score, the chatbot 210 may determine an opinion type to be applied, and may retrieve a corresponding opinion from the repository 208. Alternatively, the chatbot 210 may simply select a random opinion on the topic, or an opinion associated with characteristics that match characteristics of the participants in the conversation (or a desired personality of the chatbot 210), without considering whether the opinion is positive, negative, or neutral.

The chatbot 210 may also consider other features of the opinion. For example, the chatbot 210 may consider one or more characteristics of the person who generated the opinion (e.g., gender, language, etc., as discussed in more detail in connection with FIG. 3), and may either match the characteristics to the people participating in the conversation (e.g., selecting an opinion statement whose author corresponds closely in the identified characteristics to the participants in the conversation) or may match the characteristics to an intended persona of the chatbot 210 (for example, if the chatbot 210 is intended to sound like a woman from a particular region, then the chatbot may choose opinions expressed by women from that particular region).

The chatbot 210 may also consider a personality embedded in the opinion. Separate from the characteristics noted above, the opinion may have its own personality (e.g., witty, sardonic, etc.). These personality characteristics may be determined by evaluating the words used in the opinion, the syntax and structure of the opinion, the tone of the opinion, etc. The personality may be inferred from information known about the author of the opinion (e.g., the opinion author has been identified as having predominantly issued sarcastic opinions in the past). The personality may be matched to the participants of the conversation or an intended personality of the chatbot 210.

In some cases, the opinions in the opinion repository 208 may be altered during application by the chatbot 210. For example, assume that the chatbot 210 determines that it needs a positive opinion of the movie "Stellar Conflicts" but does not have an opinion precisely on point. The chatbot 210 may identify an opinion that is well-suited to the current conversation context, but expresses an opinion about a different movie. The chatbot 210 may analyze the opinion statement to determine that the opinion expressed does not include specific information that would be out-of-place in an opinion describing a different movie (e.g., the opinion may be discarded from consideration if it describes the other movie in the context of a series). Assuming the opinion can be made to fit the current conversation context, the chatbot 210 may replace the name of the other movie with "Stellar Conflicts" and use the opinion statement in the conversation.

In an indirect application of the language units from the repository 208, a trainer 212 may retrieve the opinion statements and information identified about the opinion statements by the opinion analysis logic 208 (e.g., information contained in an opinion structure, as described in connection with FIG. 3). The trainer 212 may include machine learning logic for learning associations between the opinion statements and the information, and may program the associations into a natural language model 214 used to generate natural language.

As part of training the model 214, it has been found that applying a term frequency/inverse document frequency (TF-IDF) analysis is helpful to focus on terms that are most directly associated with certain opinion characteristics. TF-IDF analysis allows relatively common terms to be downgraded in significance while relatively rarer terms are given more weight. Thus, a TF-IDF analysis can choose to ignore or pay less attention to words such as "I" and "the," while focusing on words such as "awesome" or "stunk." The TF-IDF analysis may be applied over all the statements in the repository 208 or over a subset of the statements in the repository 208.

The natural language model 214 may be provided with certain desired characteristics of an opinion statement (e.g., positive, negative, or neutral opinion, certain desired user characteristics, a desired personality, a context of the conversation, etc.), and the language model 214 may generate an opinion statement based on the associations learned from the trainer 212.

Whether applied directly or indirectly, the chatbot 210 may use the opinion statements in the repository 208 to formulate natural language to be used in a conversation. The formulated language may be provided as part of an output 218 of the environment 200 (e.g., as part of a message to be used in a conversation).

Exemplary Data Structure

Figure 3:
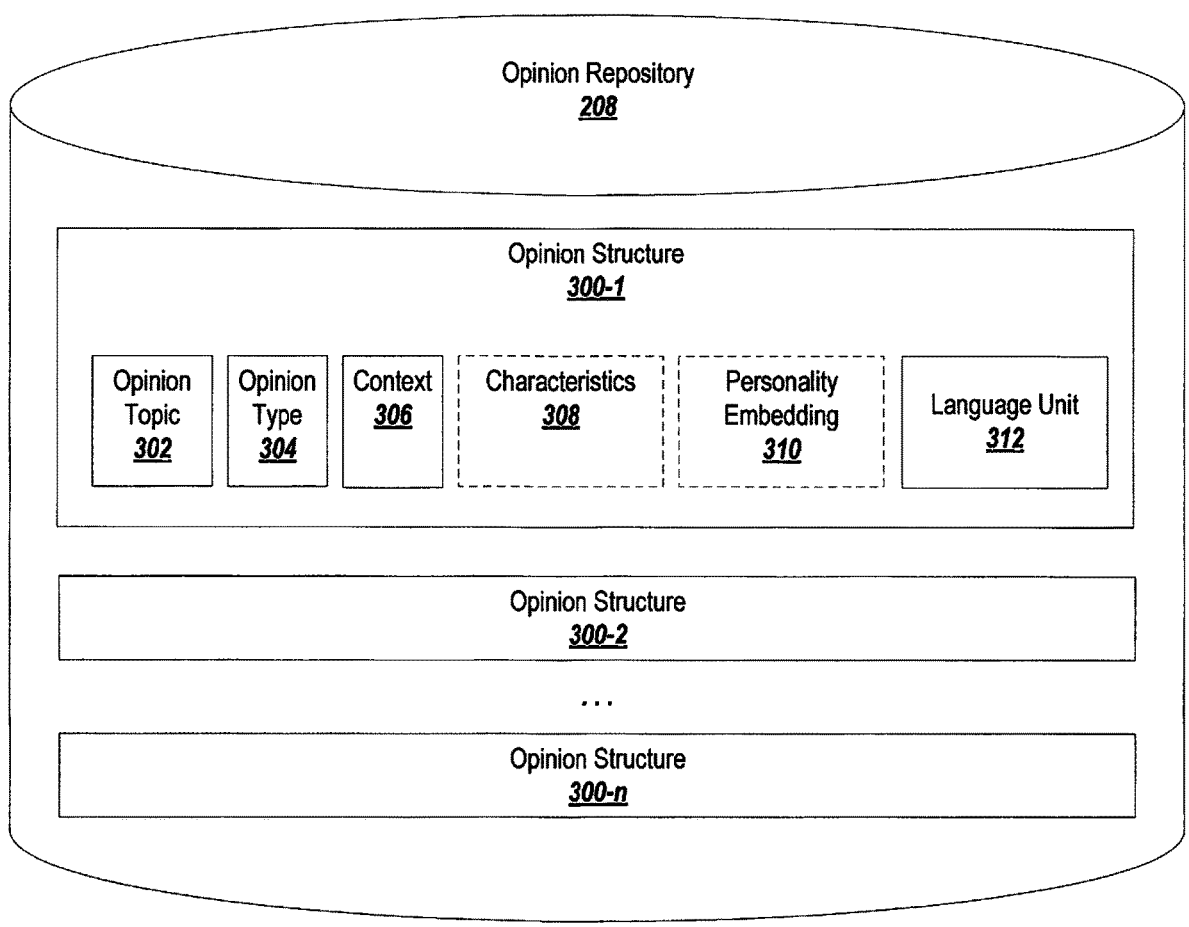
FIG. 3 depicts an example of an opinion statement repository.

FIG. 3 depicts a structure for the opinion repository 208 and the opinion statements contained therein.

The repository 208 may, for example be a database or other storage structure storing a number of opinion structures 300-i. The opinion structures 300-i may each respectively include a language unit 312 (e.g., sentences or phrases) that has passed the filters of the opinion analysis logic 206 of FIG. 2.

The opinion structures 300-i may be indexed in the repository 208 based on a topic 302 of the opinion expressed in the language unit 312. The opinion topic 302 may refer broadly to a type or genre of topics (e.g., "movies" or "science fiction") and/or may refer more specifically to a particular subject of the opinion (e.g., a particular movie or book).

The opinion structure 300 may further include an opinion type 304, indicating whether the opinion is positive, negative, or neutral. Further, the opinion structure 300 may include a conversation context 306, indicating a context in which the language unit 312 was originally used (e.g., is the opinion a response to a question, or is it a spontaneous statement). The context may include characteristics of communications associated with the opinion statement, or that were issued close in time to the opinion statement at issue). In some cases, the context may include whether the opinion statement includes lead-in information (e.g., "Sure, but it wasn't the best movie I've seen this month") and a description of the context in which the lead-in information would be appropriately used (in the above example, perhaps in response to a query such as "Is this movie worth spending $8 on?").

Optionally, the opinion structure 300 may include one or more characteristics 308 of the author of the opinion. These characteristics 308 may allow the opinion to be better matched to a particular set of users or a desired personality of the artificial intelligence. The characteristics 308 may include, for example, an age, gender, geographical location, or language of the person expressing the opinion, or any other suitable characteristics.

Further optionally, the opinion structure 300 may include a personality embedding 310 describing a personality associated with the opinion statement. The personality embedding 310 may represent, for example, results of a personality test as applied to the author of the opinion statement or to the opinion statement itself, and may be defined along one or more dimensions of personality (e.g., introverted vs. extroverted, stoic vs. gregarious, etc.). In some embodiments, the personality embedding 310 may represent a portion of the natural language model 214 (FIG. 2) that has been identified as being associated with the personality of the opinion statement, as compared to the syntax or semantic meaning of the opinion statement.

Exemplary Logic

Figure 4:
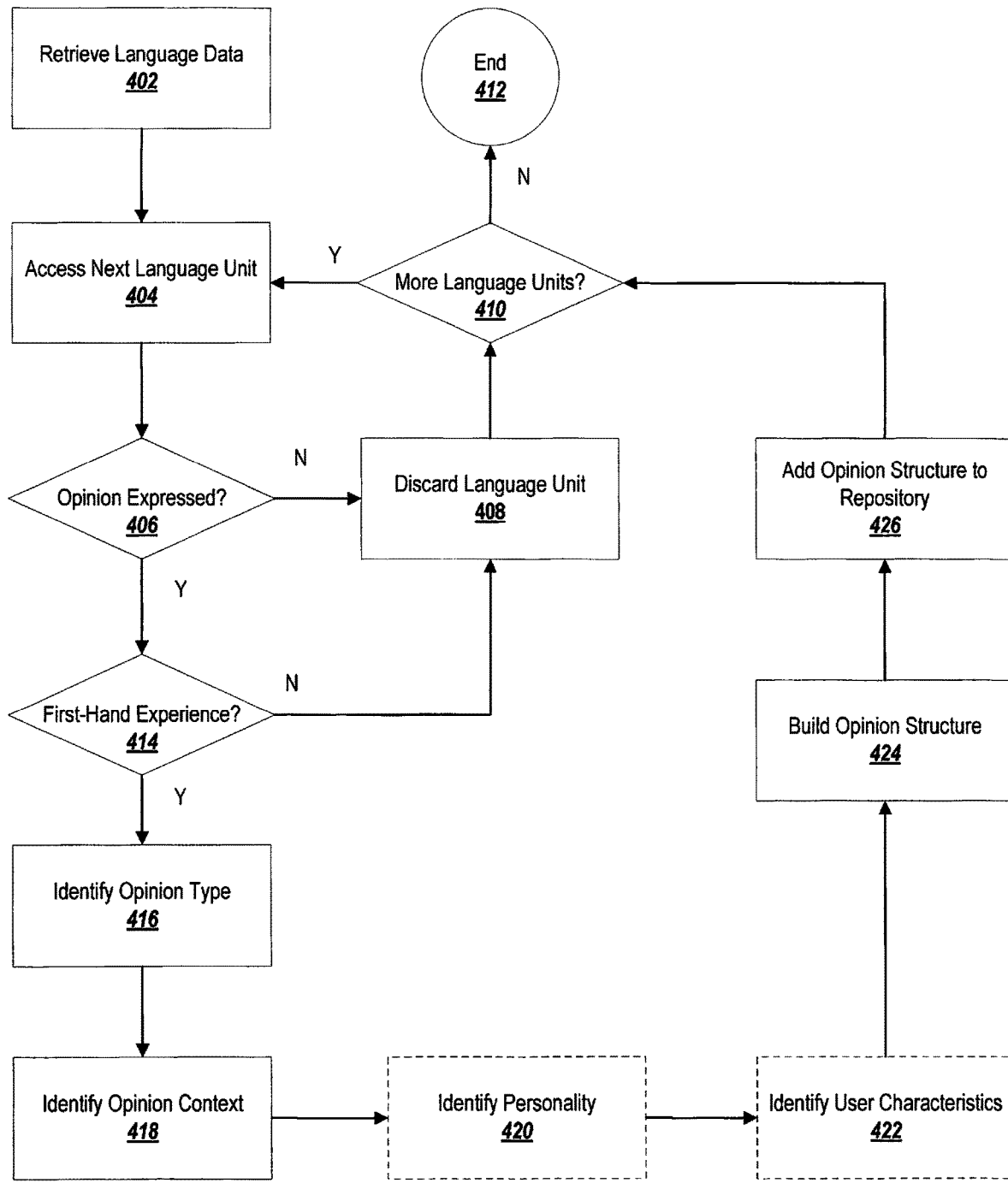
FIG. 4 is a flow chart depicting exemplary logic for performing a method according to exemplary embodiments.

FIG. 4 is a flow chart depicting an example of opinion analysis logic 206 (see FIG. 2) in more detail, for performing a method according to exemplary embodiments. The logical blocks described in connection with FIG. 4 may be performed by a system, (e.g., an apparatus having a processor and memory for executing and storing the logic, respectively), such as a server, a personal computer, or a mobile device.

At block 402, the system may retrieve language data including a number of language units (sentences and/or phrases). The language data may be retrieved directly from a service (e.g., a social networking service, a messaging service, a review service, a media sharing service, etc.) and/or may be retrieved from a repository, such as the repository 204 of unfiltered language units as depicted in FIG. 2.

At block 404, the system may access the next language unit from the language units retrieved in block 402. For instance, the language units may be stored in a memory of the system, and the system may retrieve the next unprocessed language unit from the memory.

At block 406, the system may determine whether the language unit expresses an opinion. For example, the system may search the language unit for particular terms that are closely associated with opinion statements (e.g., "loved," "hated," "good," "bad," etc.). The system may furthermore consider the structure or syntax of the language unit to determine if the structure or syntax is consistent with expressing an opinion.

If the system determines at block 406 that the language unit does not express an opinion, then at block 408 the language unit may be discarded (e.g., removed from further consideration), and the system may determine whether more language units remain to be processed (block 410). If so, processing returns to block 404 and the system retrieves the next language unit; if not, processing proceeds to block 412 and terminates.

If, on the other hand, the system determines at block 406 that the language unit does express an opinion statement, then processing may proceed to block 414. At block 414, the system may determine whether the opinion statement includes an opinion that resulted from first-hand experience with the topic of the opinion. The artificial intelligence typically expresses opinions from first-hand experience, and thus it may be desirable to train the language model with such opinions. Moreover, first-hand opinions tend to be more reliable and more varied than second-hand opinions, and therefore may result in better opinion expression for the artificial intelligence.

The system may evaluate the language, syntax, and sentence structure of the language unit to determine whether the opinion is a first-hand opinion. For example, certain key words or phrases (e.g., "I heard," "my friend said," etc.) may indicate a second-hand opinion, whereas other key words or phrases (e.g., "I saw it," "I loved it," etc.) may indicate a first-hand opinion.

If the system determines that the opinion is not first-hand, then processing may proceed to block 408 and the language unit may be discarded. If the system determines that the opinion is first-hand, then processing may proceed to block 416.

Blocks 406 and 414 may represent filters, in that a language unit is not further considered for use in opinion expression if the language unit does not pass these filters.

At block 416, the system may identify a type of opinion expressed (e.g., positive, negative, or neutral). The opinion type may be determined based on the presence or absence of certain words or phrases (e.g., positive words versus negative words, negating words such as "not," etc.).

At block 418, the system may identify a context of the opinion statement. For example, the system may analyze communications issued before and/or after the opinion statement to determine the situations in which the opinion statement might be appropriately applied. The opinion statement itself may also be analyzed for context. The system may analyze key words and phrases, sentence structure, syntax, etc. in order to determine, for example, whether the statement is a response to a query, or could be used as a query itself to prompt further discussion; the tone of the conversation in which the statement might be appropriately deployed; a particular type or style of lead-in communication that might prompt application of the opinion statement, etc.

At block 420, the system may optionally identify a personality associated with the opinion statement. The personality may be, for example, a result of a personality test or a self-reported personality as applied to the author of the statement, or may be the result of an analysis of the opinion statement itself. In some embodiments, the language model 214 may be applied to the opinion statement, and a portion of the language model 214 that is associated with personality may be analyzed to determine a personality embedding for the opinion statement.

At block 422, the system may optionally identify one or more characteristics of an author of the opinion statement. The characteristics may include, for example, a language spoken by the author, a gender of the author, an age of the author, a geographical location of the author, etc. The characteristics may be self-reported and shared with the logic 206, may be determined based on an analysis of the user's profile on the service from which the language unit originated (or another associated service), may be inferred based on an analysis of network traffic, application usage data, or device data, may be predicted based on an analysis of the opinion statement or other associated communications, etc.

At block 424, the system may collect the information determined at blocks 416-422 and may build an opinion structure (e.g., the opinion structure depicted in FIG. 3) using this information. At block 426, the opinion structure may be stored in a repository. Processing may then proceed to block 410, and the system may determine whether additional language units remain to be processed.

Communication System Overview

Figure 5A:
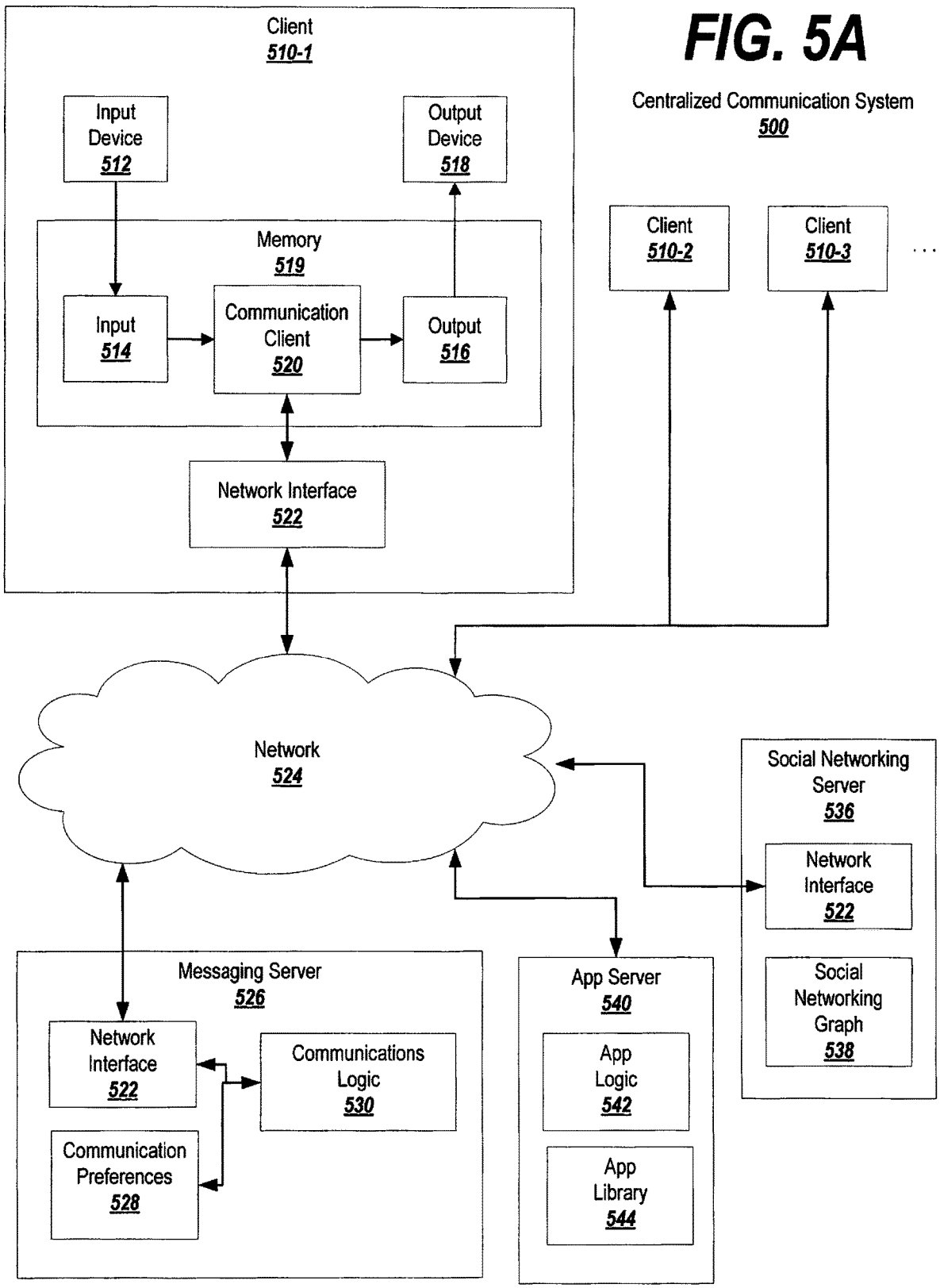
FIG. 5A is a block diagram providing an overview of a system including an exemplary centralized communications service.
Figure 5B:
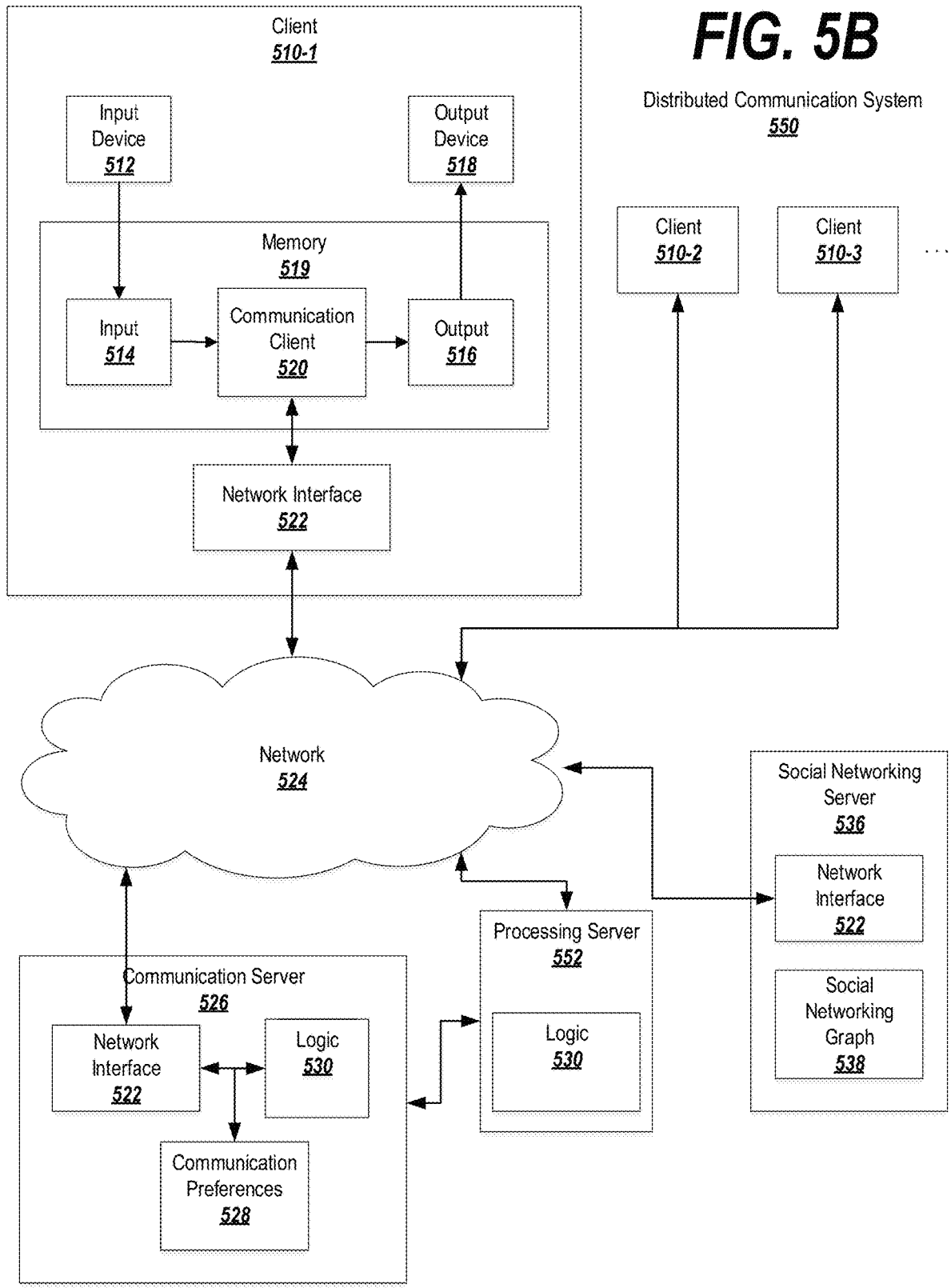
FIG. 5B is a block diagram providing an overview of a system including an exemplary distributed communications service.
Figure 5C:
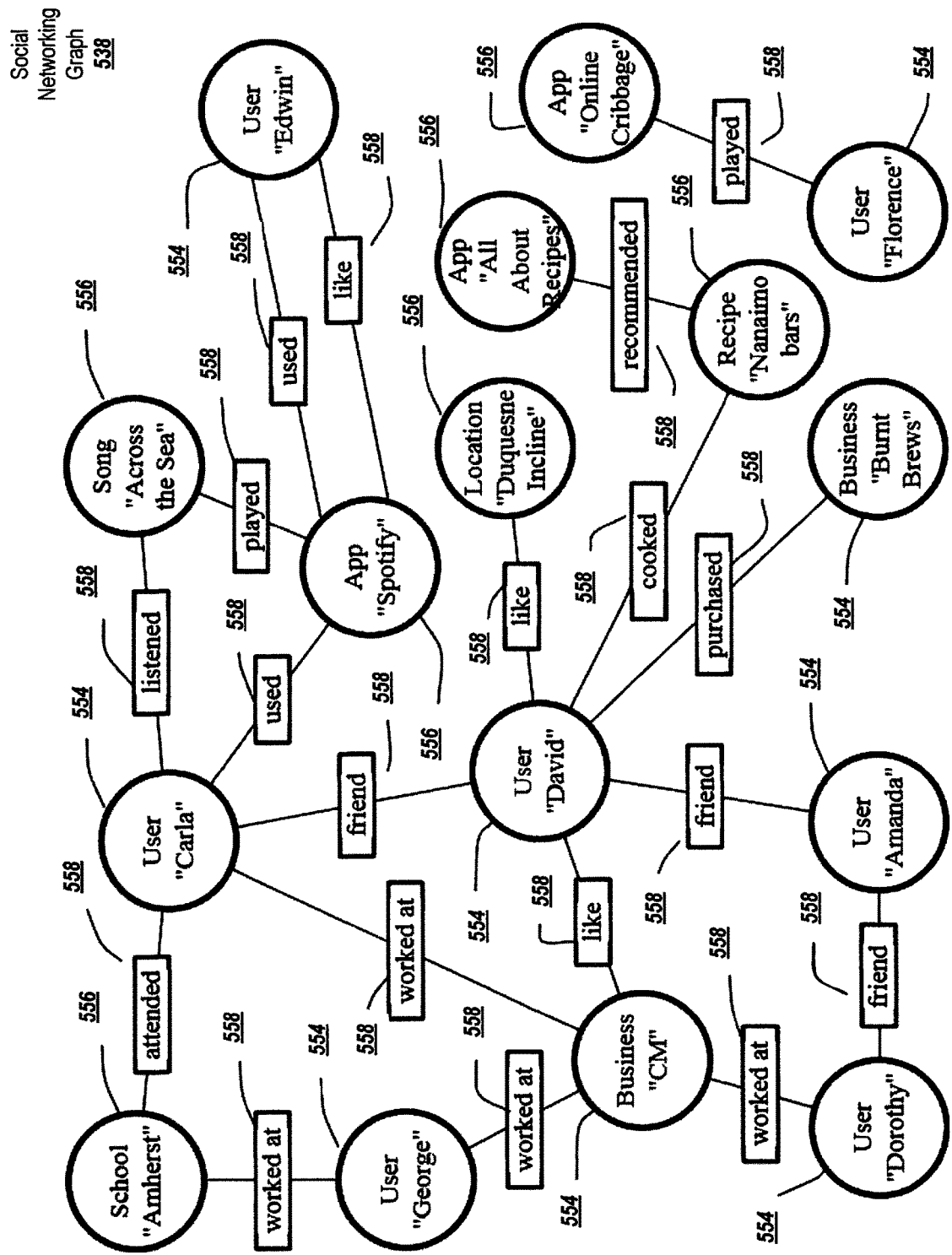
FIG. 5C depicts the social networking graph of FIGS. 5A-5B in more detail.

These examples may be implemented by a communications system that is provided either locally, at a client device, or remotely (e.g., at a remote server). FIGS. 5A-5C depict various examples of communications systems, and are discussed in more detail below.

FIG. 5A depicts an exemplary centralized communication system 500, in which functionality such as that described above is integrated into a communication server. The centralized system 500 may implement some or all of the structure and/or operations of a communication service in a single computing entity, such as entirely within a single centralized server device 526.

The communication system 500 may include a computer-implemented system having software applications that include one or more components. Although the communication system 500 shown in FIG. 5A has a limited number of elements in a certain topology, the communication system 500 may include more or fewer elements in alternate topologies.

A communication service 500 may be generally arranged to receive, store, and deliver messages. The communication service 500 may store messages or video communications while clients 520, such as may execute on client devices 510, are offline and deliver the messages/communications once the clients are available. Alternatively or in addition, the clients 520 may include social networking functionality.

A client device 510 may transmit messages addressed to a recipient user, user account, or other identifier resolving to a receiving client device 510. In exemplary embodiments, each of the client devices 510 and their respective communication clients 520 are associated with a particular user or users of the communication service 500. In some embodiments, the client devices 510 may be cellular devices such as smartphones and may be identified to the communication service 500 based on a phone number associated with each of the client devices 510. In some embodiments, each communication client may be associated with a user account registered with the communication service 500. In general, each communication client may be addressed through various techniques for the reception of messages. While in some embodiments the client devices 510 may be cellular devices, in other embodiments one or more of the client devices 510 may be personal computers, tablet devices, any other form of computing device.

The client 510 may include one or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the communication system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a communication client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the communication system 500. The ASR logic may be located at the client device 510 (so that the audio recording is processed locally by the client 510 and corresponding text is transmitted to the communication server 526), or may be located remotely at the communication server 526 (in which case, the audio recording may be transmitted to the communication server 526 and the communication server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into processable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a communication server 526. The communication server 526 may be operative to receive, store, and forward communications between clients.

The communication server 526 may include a network interface 522, communication preferences 528, and communications logic 530. The communication preferences 528 may include one or more privacy settings or other preferences for one or more users and/or message threads. Furthermore, the communication preferences 528 may include one or more settings, including default settings, for the logic described herein.

The communications logic 530 may include logic for implementing any or all of the above-described features of the present invention. Alternatively or in addition, some or all of the features may be implemented at the client 510-*i*, such as by being incorporated into an application such as the communication client 520.

The network interface 522 of the client 510 and/or the communication server 526 may also be used to communicate through the network 524 with an app server 540. The app server may store software or applications in an app library 544, representing software available for download by the client 510-*i* and/or the communication server 526 (among other entities). An app in the app library 544 may fully or partially implement the embodiments described herein. Upon receiving a request to download software incorporating exemplary embodiments, app logic 542 may identify a corresponding app in the app library 544 and may provide (e.g., via a network interface) the app to the entity that requested the software.

The network interface 522 of the client 510 and/or the communication server 526 may also be used to communicate through the network 524 with a social networking server 536. The social networking server 536 may include or may interact with a social networking graph 538 that defines connections in a social network. Furthermore, the communication server 526 may connect to the social networking server 536 for various purposes, such as retrieving connection information, communication history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the communication server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social-networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for implementing exemplary embodiments is incorporated into the communication server 526. In contrast, FIG. 5B depicts an exemplary distributed communication system 550, in which functionality for implementing exemplary embodiments is distributed and remotely accessible from the communication server. Examples of a distributed communication system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity (the app server 540 is omitted from the Figure for ease of discussion, although it is understood that this embodiment may also employ an app server 540). The primary difference between the centralized embodiment and the distributed embodiment is the addition of a separate processing server 552, which hosts the logic 530 for implementing exemplary embodiments. The processing server 552 may be distinct from the communication server 526 but may communicate with the communication server 526, either directly or through the network 524, to provide the functionality of the logic 530 and the logic 534 to the communication server 526.

The embodiment depicted in FIG. 5B may be particularly well suited to allow exemplary embodiments to be deployed alongside existing communication systems, for example when it is difficult or undesirable to replace an existing communication server. Additionally, in some cases the communication server 526 may have limited resources (e.g. processing or memory resources) that limit or preclude the addition of the additional pivot functionality. In such situations, the capabilities described herein may still be provided through the separate processing server 552.

In still further embodiments, the logic 530 may be provided locally at the client 510-$i$, for example as part of the communication client 520. In these embodiments, each client 510-$i$ makes its own determination as to which messages belong to which thread, and how to update the display and issue notifications. As a result, different clients 510-$i$ may display the same conversation differently, depending on local settings (for example, the same messages may be assigned to different threads, or similar threads may have different parents or highlights).

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 538 may furthermore include edges 558 connecting the nodes. The nodes and edges of social graph 538 may be stored as data objects, for example, in a data store (such as a social-graph database). Such a data store may include one or more searchable or queryable indexes of nodes or edges of social graph 538.

The social graph 538 may be accessed by a social-networking server 536, client system 510, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social networking system. In exemplary embodiments, when a user registers for an account with the social-networking system, the social-networking system may create a user node 554 corresponding to the user, and store the user node 554 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the socialnetworking system. In particular embodiments, a user node 554 may be associated with information provided by a user or information gathered by various systems, including the socialnetworking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTIFY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
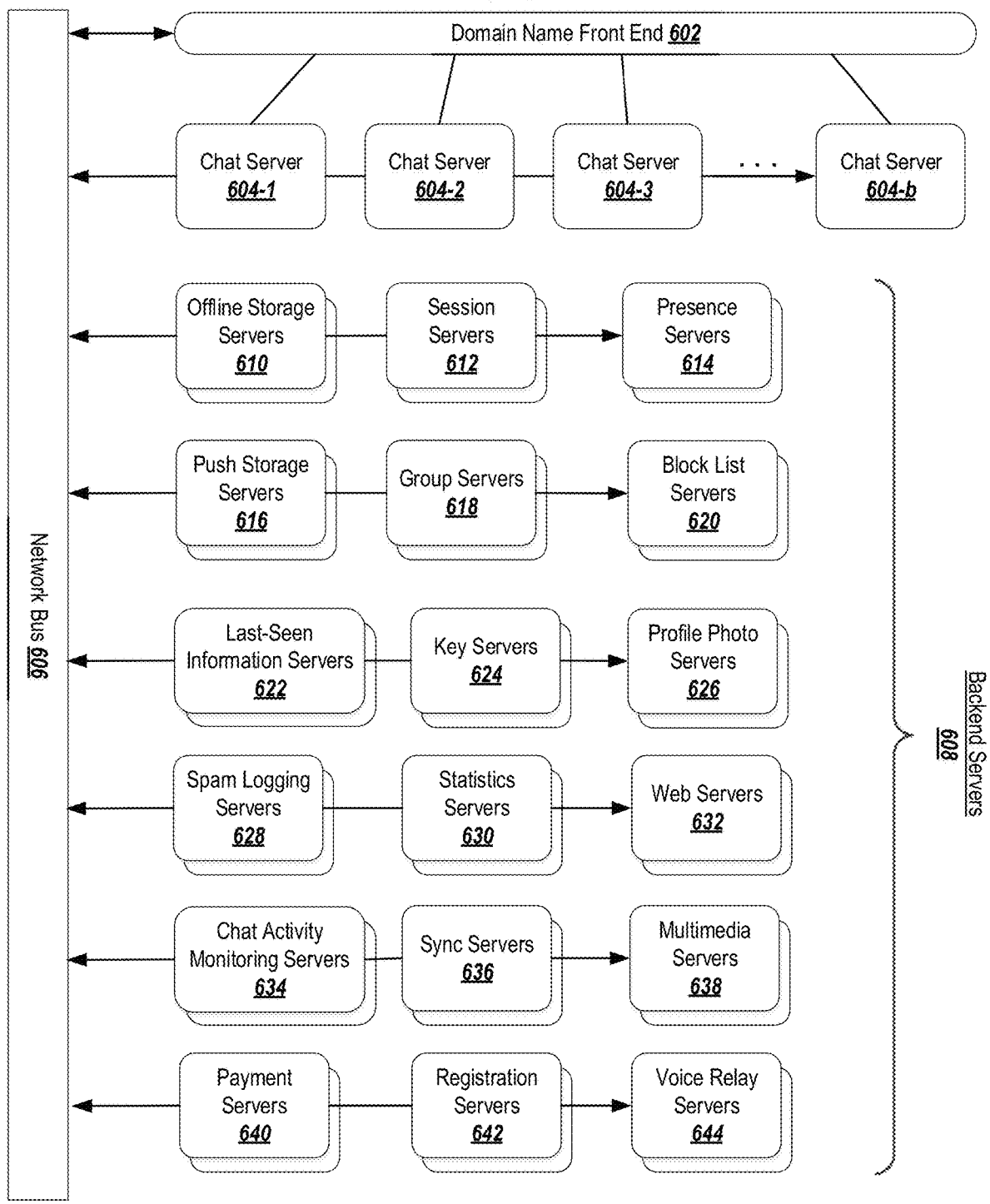
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the messaging system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-internet-protocol (VoIP) voice communication between messaging clients for the performance of VoIP calls.

Figure 7:
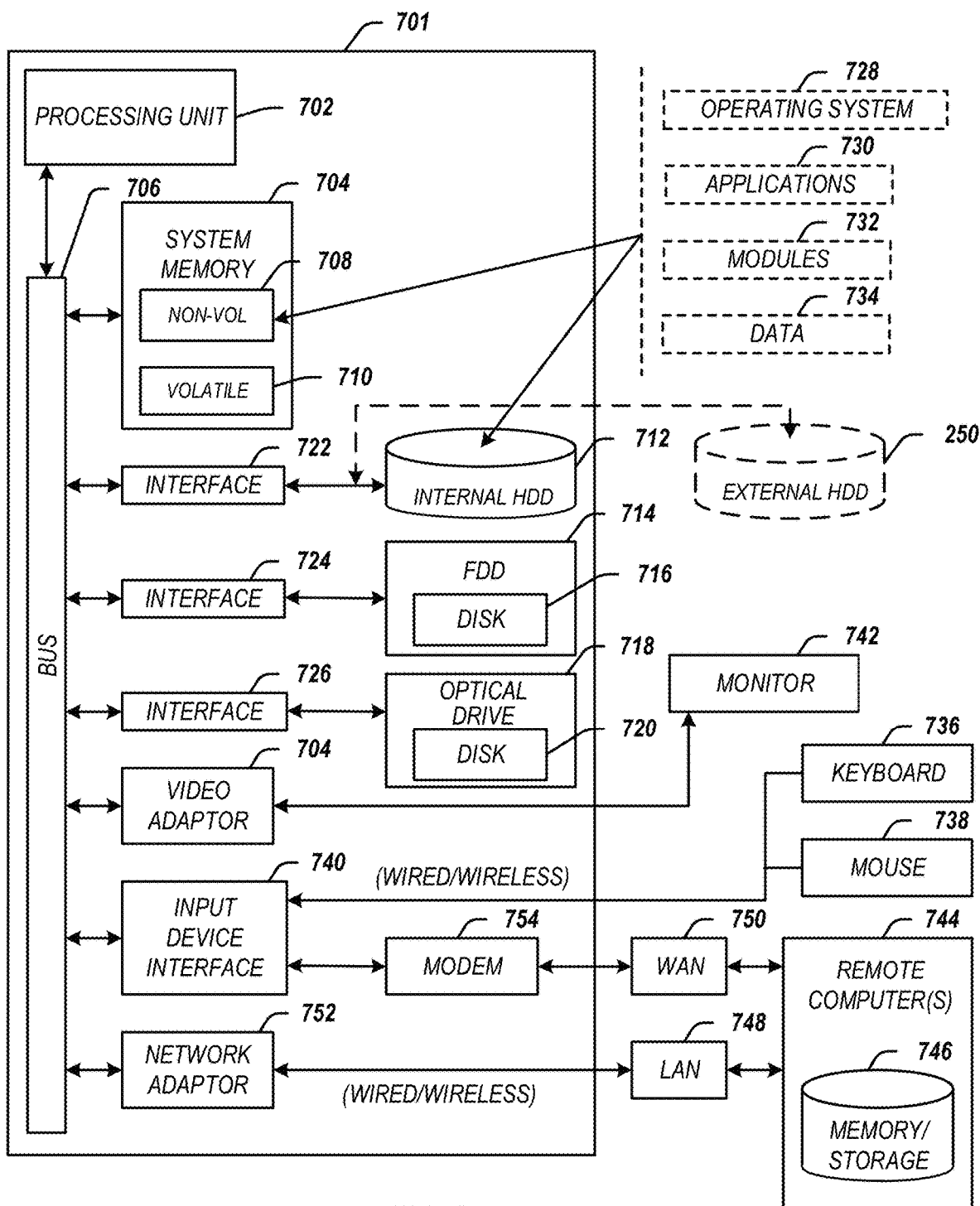
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
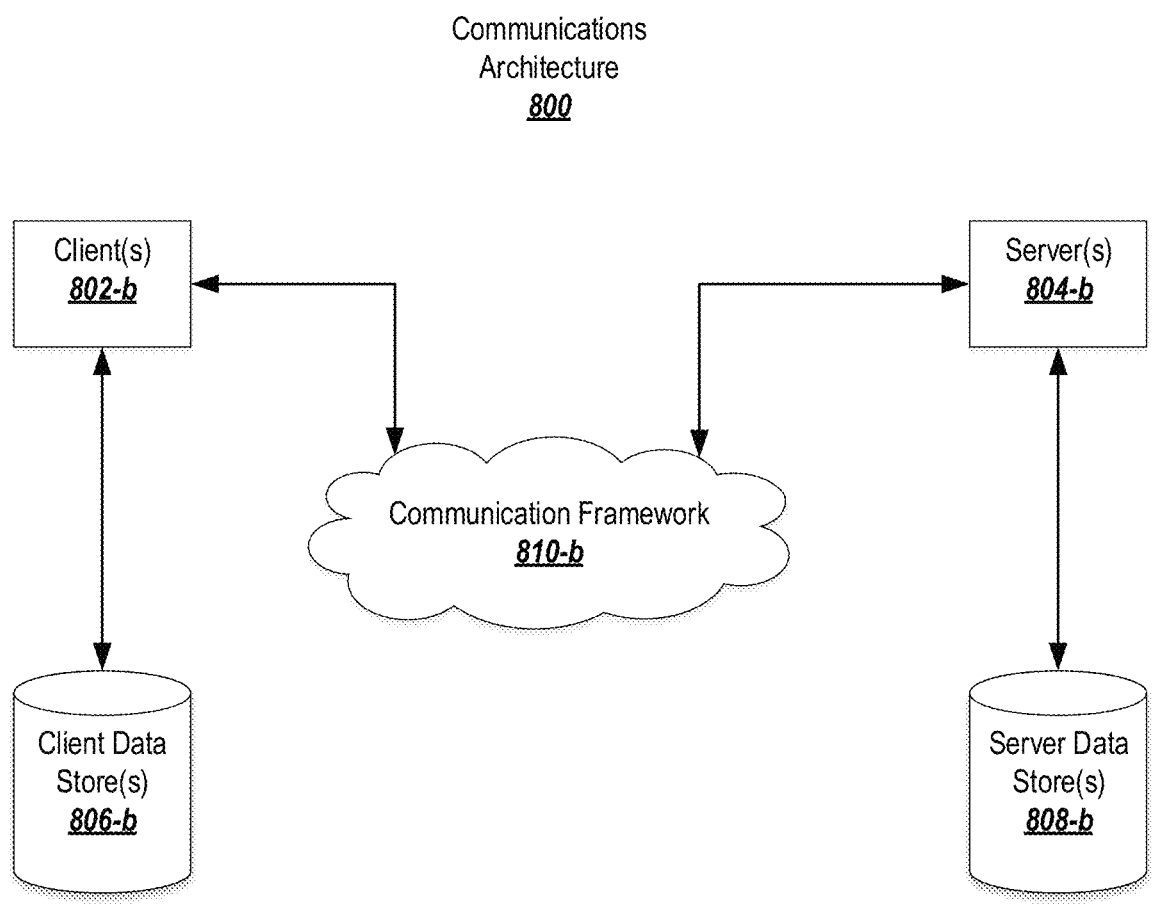
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
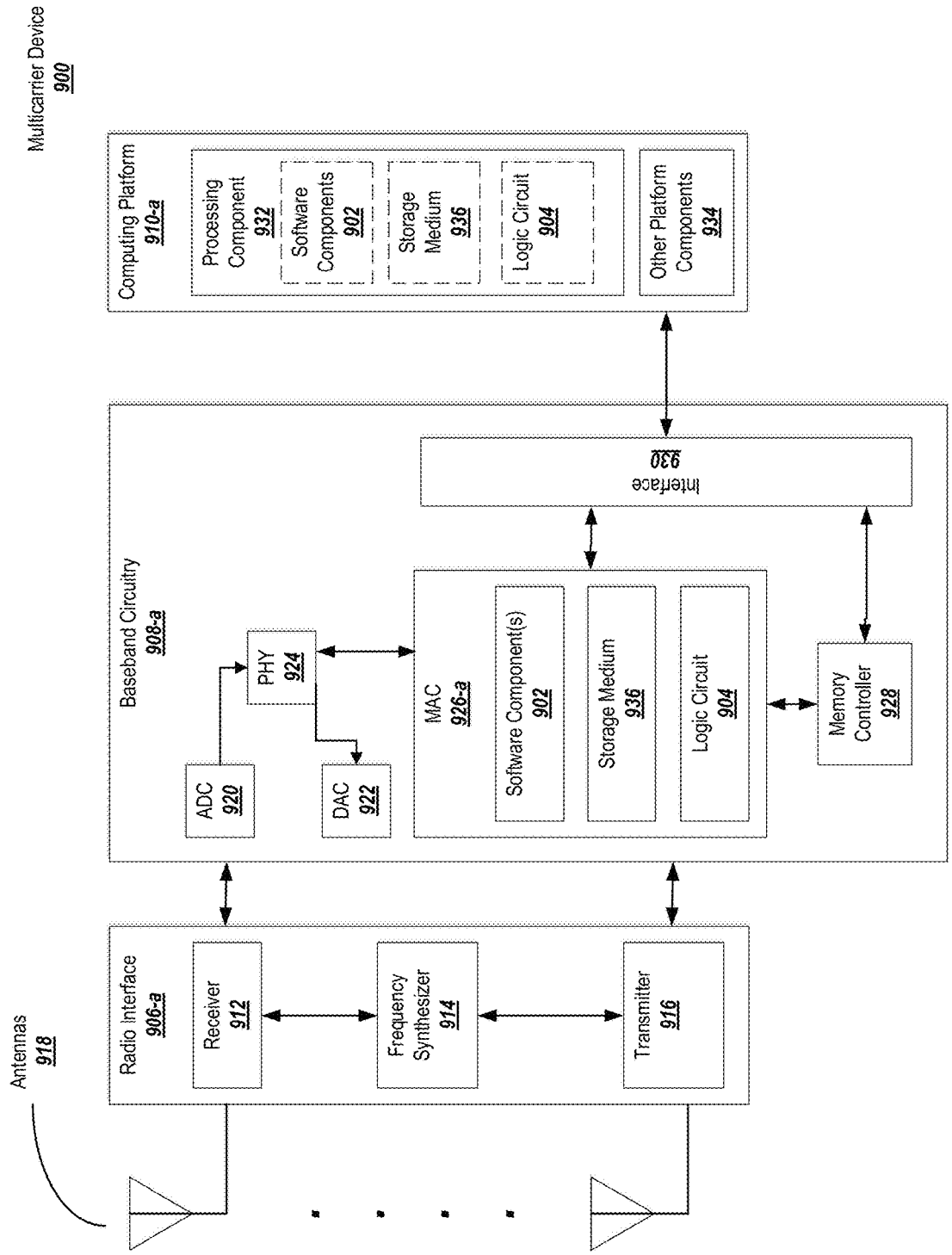
FIG. 9 is a block diagram depicting an exemplary multicarrier communications device.

FIG. 9 illustrates an embodiment of a device 900 for use in a multicarrier OFDM system, such as the messaging system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the messaging system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the messaging system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus.

Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method executed by software stored in a memory of a device, the software, when executed by a processor of the device, to perform operations comprising:
   accessing a set of language data comprising a plurality of language units, each language unit comprising a phrase or a sentence;
   filtering the language data to remove language units that do not express an opinion;
   filtering the language data to remove a first language unit of the plurality of language units, wherein the first language unit is generated by a first person not having first-hand experience of a topic of the phrase or sentence in the first language unit, wherein first language unit expresses an opinion of a second person;
   analyzing remaining language units to determine whether the opinion expressed by each remaining language unit is of a positive type or a negative type, to identify a context in which the language unit is used, and to identify characteristics comprising a gender and a location of an author of the language unit;
   associating the opinion types, the characteristics, and the contexts with the remaining language units;
   using the remaining language units to generate a vocabulary configured to be used by a natural language generator;
   storing the remaining language units, the associated opinion types, the associated contexts and the characteristics in an opinion repository available to a chatbot; and
   receiving input from one or more users via a service configured to provide the input to the chatbot, the service being operable on devices or applications;
   wherein an output text using the remaining language units is to be generated responsive to the input based in part on at least one of the genders or the locations of the authors of the remaining language units.

2. The method of claim 1, further comprising retrieving the language data from a messaging service, a social networking service, a media sharing service, or a review service, the second person having first-hand experience of the topic of the phrase or sentence in the first language unit.

3. The method of claim 1, wherein the vocabulary is generated based at least in part on a term frequency/inverse document frequency analysis, the service to comprise a group messaging service, the input comprising messages sent in a group message thread provided by the group messaging service, the output text to be outputted by the chatbot in the group message thread.

4. The method of claim 1, further comprising classifying the remaining language units based on one or more of age, language of person expressing the opinion.

5. The method of claim 1, further comprising applying the vocabulary directly at an artificial intelligence for opinion expression.

6. The method of claim 1, further comprising applying machine learning logic to generate a language model based on the vocabulary, the language model to comprise a respective personality embedding for each opinion expressed in the language data, each personality embedding comprising a plurality of personality dimensions.

7. The method of claim 1, further comprising classifying the remaining language units based on personalities expressed in the remaining language units.

8. A non-transitory computer-readable medium storing instructions that, when executed by a processor, cause the processor to:
   access a set of language data comprising a plurality of language units, each language unit comprising a phrase or a sentence;
   filter the language data to remove language units that do not express an opinion;
   filter the language data to remove a first language unit of the plurality of language units, wherein the first language unit is generated by a first person not having first-hand experience of a topic of the phrase or sentence in the first language unit, wherein first language unit expresses an opinion of a second person;
   analyze remaining language units to determine whether the opinion expressed by each remaining language unit is of a positive type or a negative type, to identify a context in which the language unit is used, and to identify characteristics comprising a gender and a location of an author of the language unit;
   associate the opinion types, the characteristics, and the contexts with the remaining language units;
   use the remaining language units to generate a vocabulary configured to be used by a natural language generator;
   store the remaining language units, the associated opinion types, the associated contexts, and the characteristics in an opinion repository available to a chatbot; and
   receiving input from one or more users via a service configured to provide the input to the chatbot, the service being operable on devices or applications;
   wherein an output text using the remaining language units is to be generated responsive to the input based in part on at least one of the genders or the locations of the authors of the remaining language units.

9. The medium of claim 8, further storing instructions for retrieving the language data from a messaging service, a social networking service, a media sharing service, or a review service.

10. The medium of claim 8, wherein the vocabulary is generated based at least in part on a term frequency/inverse document frequency analysis.

11. The medium of claim 8, further storing instructions for classifying the remaining language units based on one or more of age, language of person expressing the opinion.

12. The medium of claim 8, further storing instructions for applying the vocabulary directly at an artificial intelligence for opinion expression.

13. The medium of claim 8, further storing instructions for applying machine learning logic to generate a language model based on the vocabulary.

14. The medium of claim 8, further storing instructions for classifying the remaining language units based on personalities expressed in the remaining language units.

15. An apparatus comprising:
   a non-transitory computer-readable medium holding an unfiltered language unit repository that comprises a set of language data, the language data comprising a plurality of language units, each language unit comprising a phrase or a sentence;
   a hardware processor circuit;
   opinion analysis logic executable on the processor circuit and configured to:
      filter the language data to remove language units that do not express an opinion;
      filter the language data to remove a first language unit of the plurality of language units, wherein the first language unit is generated by a first person not having first-hand experience of a topic of the phrase or sentence in the first language unit, wherein first language unit expresses an opinion of a second person;
      analyze remaining language units to determine whether the opinion expressed by each remaining language unit is of a positive type or a negative type, to identify a context in which the language unit is used, and to identify characteristics comprising a gender and a location of an author of the language unit;
      associate the opinion types, the characteristics, and the contexts with the remaining language units; and
      use the remaining language units to generate a vocabulary configured to be used by a natural language generator;
   an opinion repository for storing the remaining language units, the associated opinion types, the associated contexts, and the characteristics, the opinion repository to be available to a chatbot; and
   a service operable on devices or applications used by one or more users, the one or more users to generate input by way of the service, the service configured to provide the input to the chatbot;
   wherein an output text using the remaining language units is to be generated responsive to the input based in part on at least one of the genders or the locations of the authors of the remaining language units.

16. The apparatus of claim 15, further comprising data mining logic for retrieving the language data from a messaging service, a social networking service, a media sharing service, or a review service.

17. The apparatus of claim 15, wherein the vocabulary is generated based at least in part on a term frequency/inverse document frequency analysis.

18. The apparatus of claim 15, wherein the opinion analysis logic is further configured to classify the remaining language units based on one or more of age, language of person expressing the opinion.

19. The apparatus of claim 15, further comprising chatbot logic configured to apply the vocabulary directly at an artificial intelligence for opinion expression.

20. The apparatus of claim 15, further comprising training logic configured to apply machine learning logic to generate a language model based on the vocabulary.

* * * * *